No. 649,586. Patented May 15, 1900.
D. G. STOUGHTON.
CLOSED CONDUIT ELECTRIC RAILWAY.
(Application filed Apr. 4, 1899.)
(No Model.) 2 Sheets—Sheet 1.
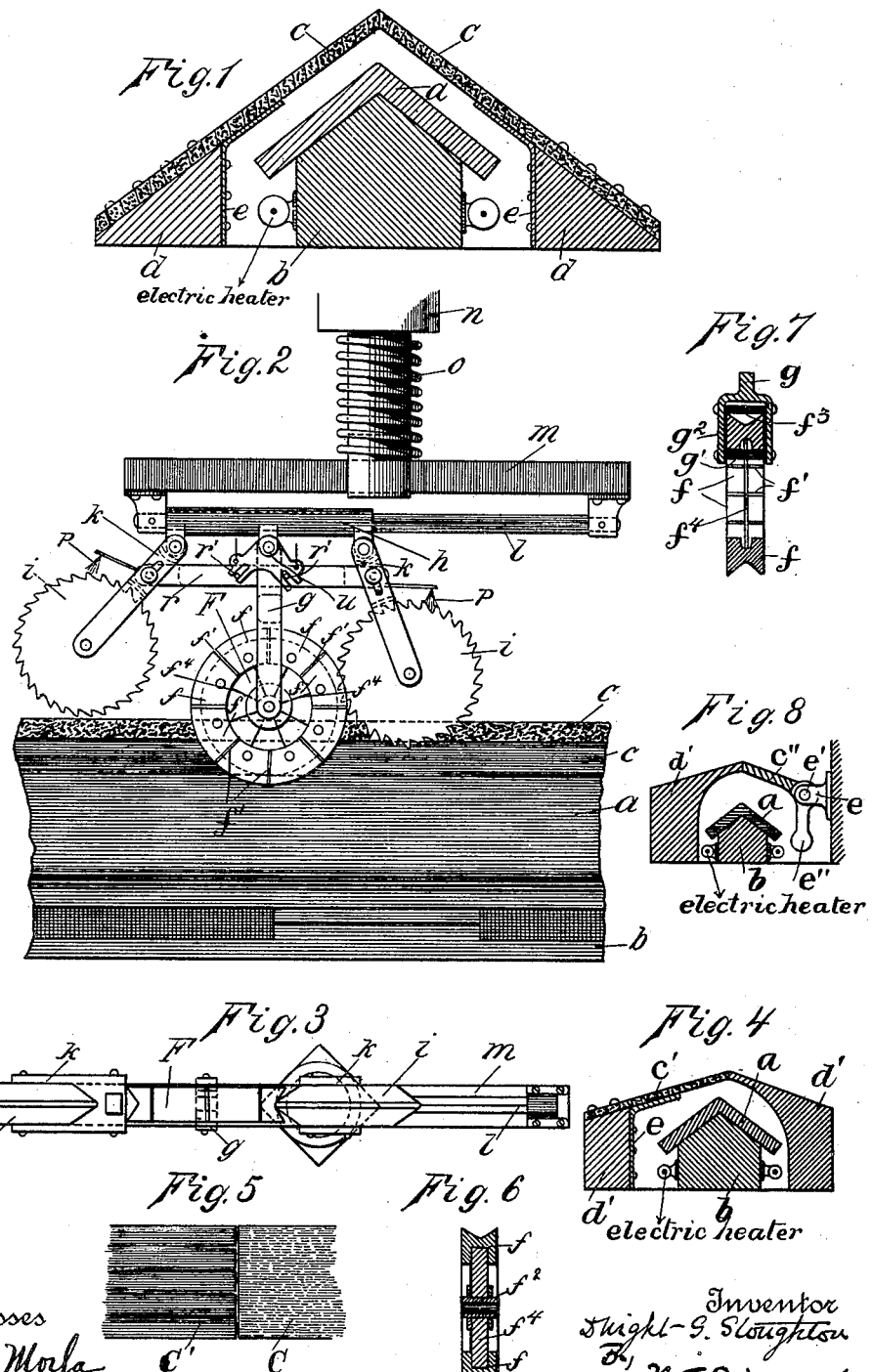

No. 649,586. Patented May 15, 1900.
D. G. STOUGHTON.
CLOSED CONDUIT ELECTRIC RAILWAY.
(Application filed Apr. 4, 1899.)
(No Model.) 2 Sheets—Sheet 2.
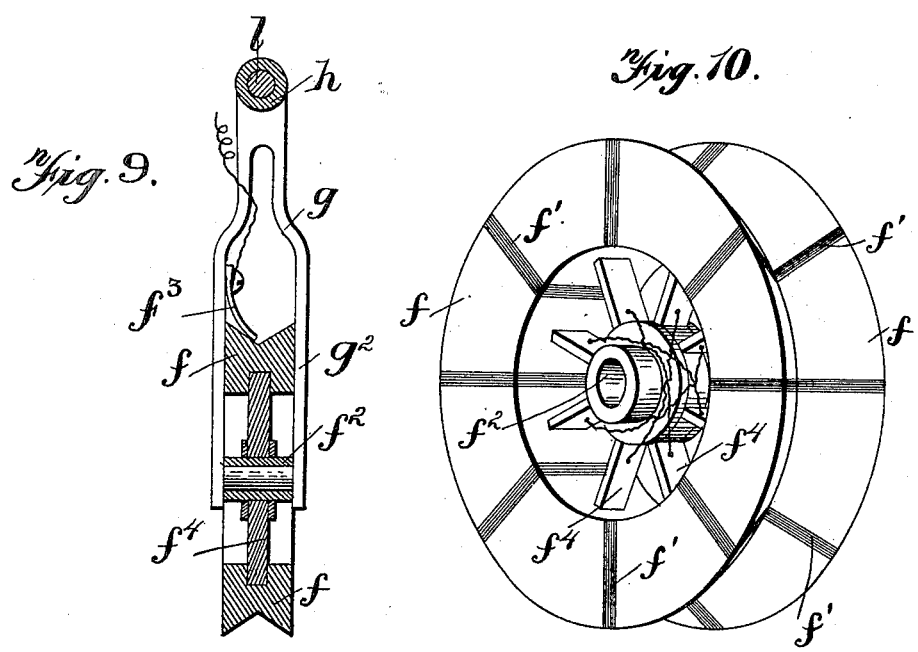
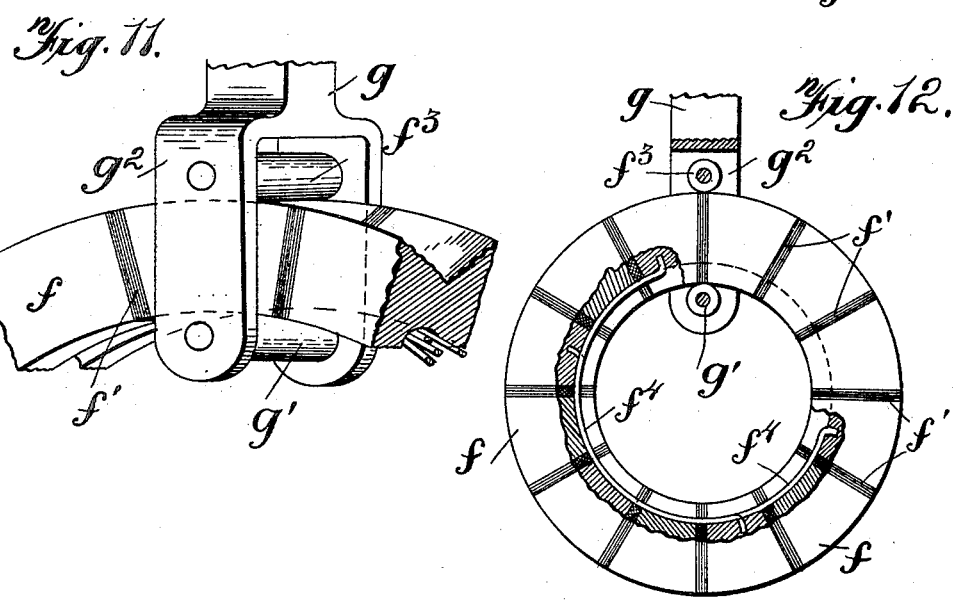
Witnesses
Geo. E. Frech.
F. R. Fitton
Inventor
Dwight G. Stoughton,
by Collamer & Co.,
Attorneys

UNITED STATES PATENT OFFICE.

DWIGHT G. STOUGHTON, OF HARTFORD, CONNECTICUT.

CLOSED-CONDUIT ELECTRIC RAILWAY.

SPECIFICATION forming part of Letters Patent No. 649,586, dated May 15, 1900.

Application filed April 4, 1899. Serial No. 711,701. (No model.)

*To all whom it may concern:*

Be it known that I, DWIGHT G. STOUGHTON, a citizen of the United States of America, residing at Hartford, in the county of Hartford and State of Connecticut, have invented a certain new and useful Improvement Applicable to Vehicles Electrically Propelled from a Line Conductor, of which the following is a description, reference being had to the accompanying drawings, wherein—

Figure 1 is a view in vertical cross-section of the electric line conductor, the automatically-operating covering-leaves, and the electrical heater. Fig. 2 is a side view of the electric line conductor, one of the automatically-operating covering-leaves, the traveling contact-piece, and the electrical heater. Fig. 3 is a view, chiefly in outline, from underneath of the traveling contact-piece. Fig. 4 is a view similar to Fig. 1, but on a smaller scale, illustrating the use of one automatically-operating covering-leaf in the place of two. Fig. 5 is a top view (small scale) illustrating the use of certain kinds of automatically-operating covering-leaves. That on the right is of elastic material and the other (on the left) is composed of non-elastic slats. Fig. 6 is a view in central radial cross-section of the wheel-electrode. Fig. 7 is a view similar to Fig. 6, showing the wheel-electrode in the form of a hoop or ring supported and carried by roller-bearings. Fig. 8 is a view (small scale) in vertical cross-section, showing one rigid covering-leaf (the one at the left) and one (that at the right) automatically operating. Fig. 9 is a central vertical section through the staff of Fig. 2. Figs. 10, 11, and 12 are enlarged perspective views of the wheel-electrodes shown, respectively, in Figs. 2, 6, and 7.

The improvement is specially applicable to vehicles which travel on rails and which are electrically propelled from a line conductor situated midway of the rails.

In the accompanying drawings the letter $a$ denotes the electric line conductor—that is, the main conductor of the electric energy. It is practically made in lengthwise sections with sloping sides, the sections being duly connected to each other and supported upon a suitable insulating-base $b$.

The letter $c$ denotes in Figs. 1 and 2 automatically-acting covering-leaves for the electric line conductor, made of a material the nature of which it is to return to the normal position when forced out of that position. India-rubber, or a composition thereof, well fulfils these requirements. These covering-leaves are duly supported—as, for instance, by the supports $d$ and the angle-irons $e$. These covering-leaves converge or slope toward each other, so that they may shed rain and the like, and it is preferred that they meet and touch at a line which is central over the middle of the rail $a$.

Modifications of the above construction are shown in Figs. 4 and 8. In the former there is a leaf $c'$, flexibly supported by angle-irons $e$, as above described, over half of the conductor only, while the support $d'$ at the opposite side is built up in a rigid leaf meeting the inner edge of the movable leaf, as shown. In Fig. 8 one side of the support $d'$ is similarly built up in a rigid leaf standing over half and extending to the center of the conductor $a$, and the movable leaf $c''$ at the other side is hinged, as at $e'$, to angle-irons $e$ and assisted in closing to its normal position by weights $e''$. In the construction of this conduit I preferably locate electrical heaters at intervals along the sides of the base $b$, as indicated by the words "electric heaters," whose function it is to heat the parts slightly, so as to thaw snow or ice which may rest or lodge upon the leaves or covering of the conduit, and as the tops of the same slope outward in both directions from its transverse center it will be clear that snow or ice when thawed will flow away from the slot and will not run into the same when it is opened.

In Fig. 5 is shown a further modified form of the covering for the conduit wherein the leaf C on the right may be of rubber, while the leaf C' on the left is made up of a series of slats which are hinged at their outer ends in any suitable manner—for instance, as shown in Fig. 8.

The electric energy is taken from the electric line conductor $a$ by a wheel-electrode (denoted as a whole by the letter F,) whence it passes through a suitable conductor to the electric motor on the vehicle which propels that vehicle. The peculiar construction of this wheel-electrode will be described later on.

The letter $g$ denotes a staff carrying the wheel-electrode and which is in turn carried by the sleeve $h$.

The letter $i$ denotes two devices which may well be called "leaf-openers." They are situated, respectively, in front and rear of the wheel-electrode. It is their function to open the covering-leaves in advance of the wheel-electrode. They are carried on staves $k$, which are in turn pivoted to and carried by the sleeve $h$. This sleeve $h$ has a capacity for sliding on the rod $l$ and of course carrying with it in these movements the wheel-electrode and the two leaf-openers. The rod $l$ is fast to the beam $m$, and that is supported from the vehicle through the medium of the pintle or pillar $n$.

The letter $o$ denotes a spring which normally holds the wheel-electrode down upon the electric line conductor, but permits it to rise temporarily therefrom when an obstruction is encountered.

The leaf-openers are practically wheels of wedge shape at the circumference, and there (at the periphery) they are formed into hooks which are adapted to catch and carry out of the inclosure which contains the electric line conductor any particles of rubbish or refuse they may come in contact with.

The letter $p$ denotes brushes which tend to clean the peripheries of the leaf-openers as they revolve.

The staves supporting the two leaf-openers are connected by the yoke $r$, and as the staves $k$ are pivoted to the sleeve $h$ it results that when one of the leaf-openers is thrown downward the other is thrown upward. The leaf-openers are caused to revolve when thrown downward by then coming in contact with a V-shaped groove in the periphery of the wheel-electrode, which is seen in Figs. 3, 6, and 7. The leaf-openers may be held in either of their adjustments by means of the pawl $u$, which is adapted to coöperate with the pins $r'$, carried by the yoke $r$.

The wheel-electrode used in connection with the devices above described is shown in two of its forms in Figs. 6 and 7 and more in detail in Figs. 9 to 12. It consists in either form of a rim made in metallic sections $f$, separated from each other by insulation $f'$, and each section is electrically connected with that diametrically opposite by wires or other suitable devices $f^4$. In the form shown in Figs. 6, 9, and 10 there is a hub $f^2$, of insulating material, around which the connecting-wires $f^4$ pass, and $f^3$, Fig. 9, is a contact on the staff $g$, above the axis of the hub, for taking the electrical energy only from that pair of sections which are vertical. The wheel is mounted on a pivot at the lower end of the staff, extending through the bore of the hub and insulated therefrom. In the form shown in Figs. 7, 11, and 12 the wheel-body is a ring of considerable diameter supported upon a roller $g'$, carried in a fork $g^2$ at the lower end of the staff $g$, and the advantage of this large ring over a wheel-electrode of smaller size or solid body is that it will not bind in the slot of the conductor when rounding corners. With either form the section at the bottom makes contact with the line conductor $a$, and at the same time the diametrically-opposed section $f$ contacts electrically with the staff, so that the circuit flows from the former to the latter, while there is no current in any other section of the wheel, and hence no escape or leakage through the touching of sections thereof against anything that would draw away the energy. I consider these forms of wheel-electrodes highly important in connection with the devices above described, but do not limit myself to the specific constructions herein shown.

I claim as my improvement—

1. In combination; the conduit inclosing the electric line conductor; the automatically-operating covering-leaf; the wheel-electrode; a leaf-opener adapted to precede the wheel-electrode and in contact with its periphery; and a suitable support for the wheel-electrode and the leaf-opener; all substantially as described and for the purposes set forth.

2. In combination; the inclosed electric line conductor; the automatically-operating covering-leaf; the wheel-electrode; leaf-openers in front and rear of the wheel-electrode; supports for the wheel-electrode and for the leaf-openers; a yoke connecting the supports for the openers, pins on this yoke, and a pawl pivoted to the support for the electrode and engaging said pins; all substantially as described and for the purposes set forth.

3. In combination; the inclosed electric line conductor; the automatically-operating covering-leaf; the wheel-electrode; the leaf-openers in front and rear of the wheel-electrode adapted to be automatically and alternately adjusted within or without the inclosure; and a suitable support for the wheel-electrode and the leaf-openers; all substantially as described and for the purposes set forth.

4. In combination; the inclosed electric line conductor; the automatically-operating covering-leaf; the wheel-electrode; the leaf-openers in front and rear of the wheel-electrode; the yoke connecting the staves carrying the leaf-openers and adapted to cause one to fall while the other rises; and a suitable support for the wheel-electrode and the leaf-openers; all substantially as described and for the purposes set forth.

5. In combination; the inclosed electric line conductor; the automatically-operating covering-leaf; the wheel-electrode; a leaf-opener adapted to precede said wheel-electrode and to be rotated by contact therewith; and a suitable support for the wheel-electrode and the leaf-opener, all substantially as described and for the purposes set forth.

6. In combination; the inclosed electric line conductor; the automatically-operating covering-leaf; the wheel-electrode; the leaf-openers in front and rear of the wheel-electrode; the sliding sleeve carrying the wheel-electrode and the leaf-openers; the rod adapted to permit said sleeve to slide thereon; and a suitable support for the rod; all substantially as described and for the purposes set forth.

7. In combination; the inclosed electric line conductor; the automatically-operating covering-leaf; the wheel-electrode; the rotary leaf-openers; means for turning the forward leaf-opener in a direction the reverse of that of the electrode; and a suitable support for the wheel-electrode and the leaf-openers; all substantially as described and for the purposes set forth.

8. In combination; the inclosed electric line conductor; the automatically-operating covering-leaf; the wheel-electrode; the rotary toothed leaf-openers; and a suitable support for the wheel-electrode and the leaf-openers; all substantially as described and for the purposes set forth.

9. In combination with a wheel-electrode, and a leaf-opener preceding it and rotating in a reverse direction; a line conductor, and a conduit inclosing the same and built up in a rigid leaf at one side to a point over the center of the conductor, an angle-iron carried by a support at the other side of the conductor, and an upwardly-movable leaf sustained by the angle-iron in normal contact over the center of the conductor with the inner edge of the support where the latter is built up, all substantially as described and for the purposes set forth.

10. In combination with a wheel-electrode, and a leaf-opener preceding it; a line conductor, and a conduit inclosing the same and built up in a rigid leaf at one side to a point over the center of the conductor, an angle-iron carried by a support at the other side of the conductor, a movable leaf pivoted therein and of a width to reach the inner edge of the rigid leaf, and weights carried by the movable leaf for holding it normally closed against the rigid leaf, all substantially as and for the purposes set forth.

11. A wheel-electrode for underground-trolley systems consisting of an annular series of metallic sections separated by insulation and electrically connected in diametrically-opposite pairs; combined with a support therefor, and a contact to take the electrical energy from the uppermost section while its fellow section is in contact with the conductor and all other sections are out of connection with either the conductor or the support, as and for the purposes set forth.

12. A wheel-electrode for underground-trolley systems consisting of a ring of considerable diameter made up of metallic sections separated by insulation, and electrical connections between diametrically-opposite sections only; combined with a support, and a contact thereon for making electrical connection with the uppermost section only, all substantially as and for the purposes set forth.

13. A wheel-electrode for underground-trolley systems consisting of a ring of considerable diameter made up of metallic sections separated by insulation, and electrical connections between diametrically-opposite sections only; combined with a support having a fork at its lower end, and a roller carried by the fork and supporting the ring while making electrical connection with the uppermost section only, all substantially as and for the purposes set forth.

DWIGHT G. STOUGHTON.

Witnesses:
W. E. SIMONDS,
LULU MORLA.